(12) United States Patent
Bauer

(10) Patent No.: US 6,185,252 B1
(45) Date of Patent: Feb. 6, 2001

(54) PROCESS FOR DECODING A DIGITAL SIGNAL AND A BUS SYSTEM AND A PERIPHERAL UNIT THEREFOR

(75) Inventor: Joachim Bauer, Oberstenfeld-Prevorst (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/941,846

(22) Filed: Oct. 1, 1997

(30) Foreign Application Priority Data

Oct. 21, 1996 (DE) ............................................. 196 43 502

(51) Int. Cl.⁷ ...................................................... H03K 7/08
(52) U.S. Cl. ............................ 375/238; 327/26; 327/172; 329/312
(58) Field of Search .............................. 375/238; 327/26, 327/172; 329/312; 701/29

(56) References Cited

U.S. PATENT DOCUMENTS

| 3,864,583 | 2/1975 | Fiorino | 307/235 R |
|---|---|---|---|
| 3,939,304 * | 2/1976 | Ribes | 178/68 |
| 4,265,200 | 5/1981 | Wessel et al. | |
| 4,408,166 * | 10/1983 | Moeller | 329/106 |
| 4,853,623 | 8/1989 | Sterler et al. | 324/158 |
| 5,363,405 | 11/1994 | Hormel | 375/7 |
| 5,832,397 * | 11/1998 | Yoshida et al. | 701/29 |

FOREIGN PATENT DOCUMENTS 26 53 046   5/1978   (DE).
28 45 598   4/1979   (DE).

* cited by examiner

*Primary Examiner*—Stephen Chin
*Assistant Examiner*—Mohammad Ghayour
(74) *Attorney, Agent, or Firm*—Kenyon & Kenyon

(57) ABSTRACT

In a method for decoding digital PWM signal and a bus system, a peripheral unit, and a device therefor, the digital signal is decoded by integrating the pulse width of each bit and then comparing the integration result with a reference signal. The bus system includes dual wires, a device, and at least one peripheral unit. In an embodiment of the present invention, the bus system issued as an air bag system where diagnostic and deployment commands are sent via the bus wires to one or more peripheral units which control individual air bags.

7 Claims, 3 Drawing Sheets

FIG. 3
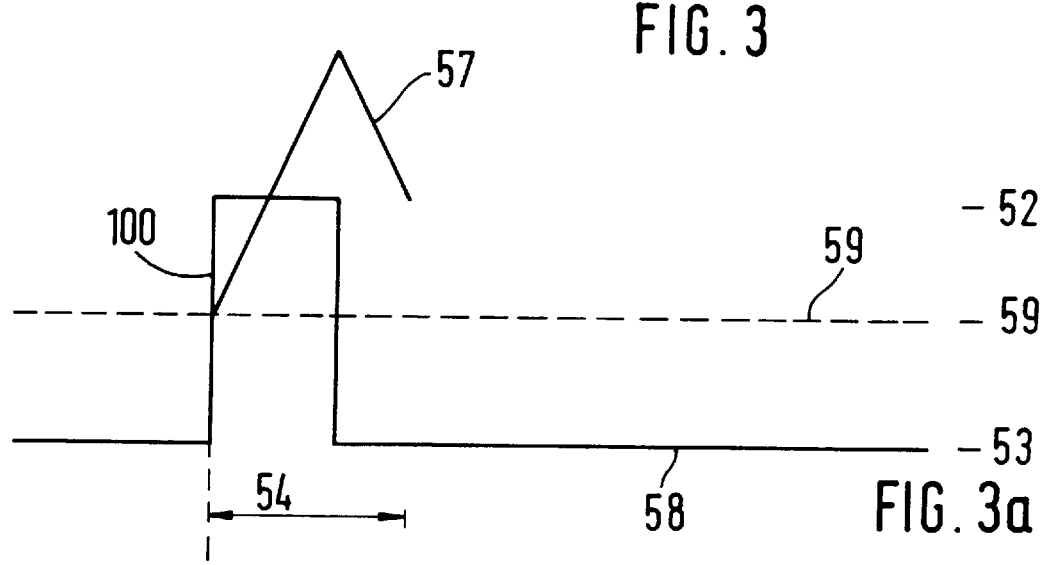
FIG. 3a
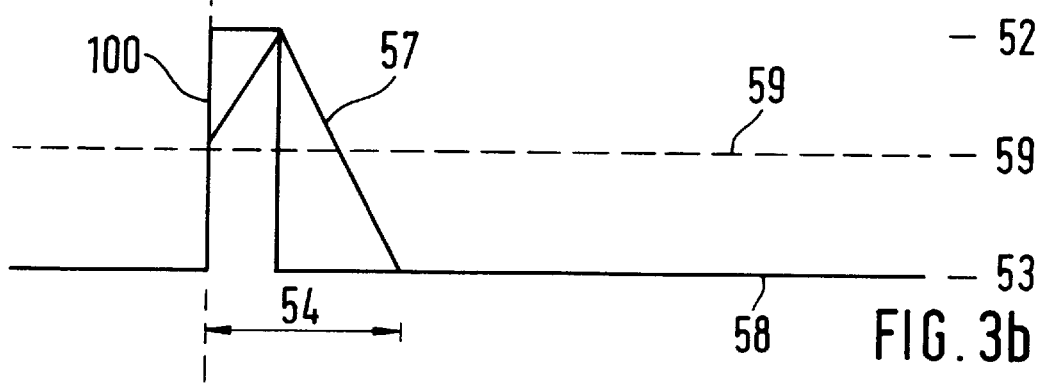
FIG. 3b
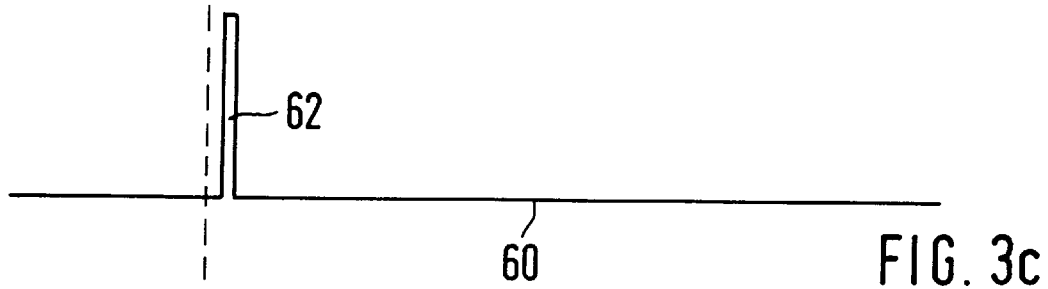
FIG. 3c
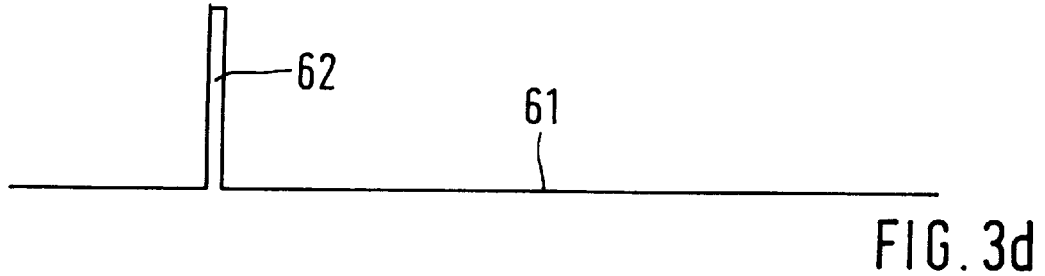
FIG. 3d

PROCESS FOR DECODING A DIGITAL SIGNAL AND A BUS SYSTEM AND A PERIPHERAL UNIT THEREFOR

FIELD OF THE INVENTION

The present invention relates to a method for decoding a digital signal, a bus system and a peripheral unit therefor.

BACKGROUND INFORMATION

A method for decoding a digital signal is already known where the digital signal is-a pulse-width modulated signal. The signal can assume two states: a high signal level and a low signal level. In pulse-width modulation, a certain time (total pulse width) is provided for each bit to be transferred. The signal first assumes the low level and then the high level during the total pulse width, with the duration of the high signal level constituting either one-third or two-thirds of the total pulse width. Other proportions are, of course, also conceivable. The first case corresponds to a coded binary zero, the second case corresponds to a binary one. This bit is decoded by measuring the signal level at a point approximately mid-way through the total pulse width. For this purpose, the decoder is provided with an oscillator to reliably measure the middle of the total pulse width.

Including an oscillator increases the cost of the decoder. If longer bit streams are to be decoded, the oscillator must have high accuracy and the total pulse widths of the individual bits must be reproducible to a high degree. This requirement makes the use of high-precision and accurately adjusted oscillators necessary both in the encoder and the decoder.

Furthermore, unpublished German Patent Application No. 196 162 93.9 discloses a bus system for transmitting messages between a controller and a peripheral unit, wherein the controller sends messages of high and low urgency to the peripheral unit. The high-urgency messages have a greater amplitude and data transmission rate than the low-urgency messages. The messages consist of digital signals, where a binary zero corresponds to a low signal level, and a binary one corresponds to a high signal level.

SUMMARY OF THE INVENTION

An advantage of the process according to the present invention is that no oscillator is needed in the decoder. The signal/noise ratio is also improved and the error rate of the data transmission is reduced due to the integral analysis of the entire signal instead of a discreet point of the signal. In addition, decoding is independent of the total pulse width and the corresponding data transmission rate.

The bus system, the peripheral unit, and the device according to an exemplary embodiment of the present invention have the advantage that they have a simpler and therefore less expensive design. The peripheral unit has the further advantage that a single decoder is provided for the different data transmission rates.

It is particularly advantageous if the input signal of the comparator is manipulated so that the binary zero and binary one differ by having different polarities. This criterion is self-normalizing in the sense that it is independent of the total pulse width. Thus, the decoder can decode digital words independent of the data transmission rate, and also when the total pulse width varies from bit to bit.

After adding a third signal to the signal to be decoded, it is also advantageous to add a fourth signal so that the signal to be decoded preserves its polarity during the total pulse width of a bit. Adding the fourth signal avoids the need to send a polarity bit to the VFC.

According to the present invention, it is also particularly advantageous to transmit high-urgency and low-urgency messages in the bus system, with the former having a higher amplitude than the latter, so that the higher-urgency messages automatically overwrite the lower-urgency messages. It is also advantageous to keep the total pulse width of the higher-urgency messages lower than the pulse width of the low-urgency messages to increase the transmission rate for the high-urgency message. A better EMC is achieved for the low-urgency messages due to their larger total pulse width.

According to an exemplary embodiment of the present invention, it is advantageous to design of the bus system of the present invention as an ignition bus for an air bag system where the low-urgency messages are diagnostic queries and the high-urgency messages are ignition commands, as such an air bag system has a flexible design and is easy to expand and/or repair.

BRIEF DESCRIPTION OF THE DRAWINGS

FIG. 3a shows a signal with a pulse-width modulated bit, to which a second signal has been added according to an embodiment of the present invention;

FIG. 3b shows the integral over the signal of FIG. 3a according to an embodiment of the present invention;

FIG. 3c shows a first trigger signal according to an embodiment of the present invention;

FIG. 3d shows a second trigger signal according to an embodiment of the present invention;

DETAILED DESCRIPTION OF THE INVENTION

Figure 1:
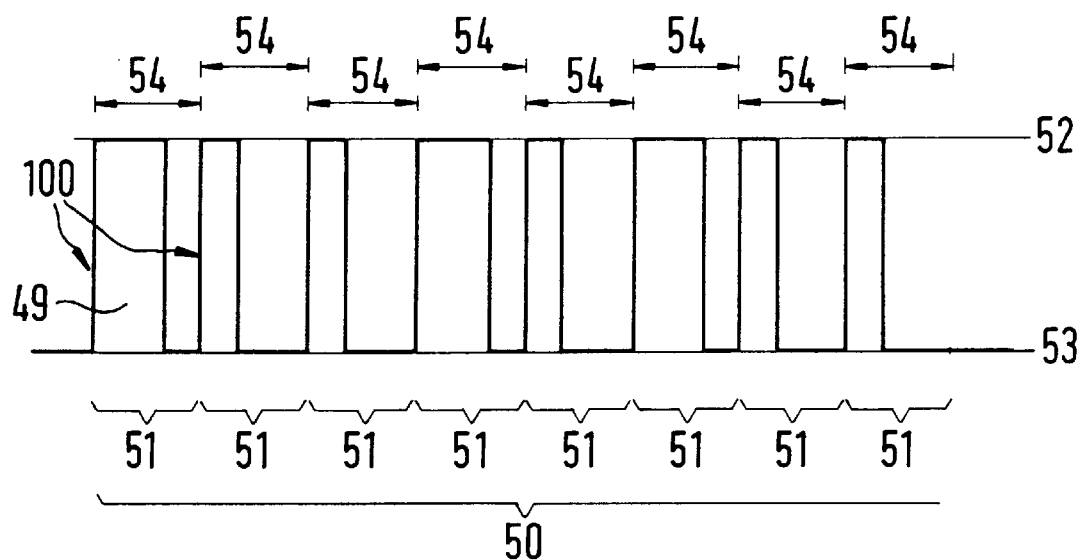
FIG. 1 shows a digital signal with pulse-width modulated bits according to an embodiment of the present invention.

As explained below, FIG. 1 shows a digital signal 50 with pulse-width modulated bits forming the binary number 10010100. The last bit of digital signal 50, a zero, is a stop bit 49. Digital signal 50 can then alternate between two signal levels, a high signal level 52 and a low signal level 53. The difference between the two signal levels is sufficiently great, so that interfering effects such as noise, drift, or small deviations from the ideal signal level can be considered negligible. Therefore, these effects are not shown in FIG. 1.

Signal 50 is a sequence of 8 bits 51. All bits have the same time length, which is equal to the total pulse width 54. If no data is transmitted, signal 50 assumes its low level 53. A bit starts with a steep rise 100 to a high signal level 52. In the first bit, the high signal level is maintained over two-thirds of the total pulse width. This is followed by a steep drop to the low signal level 53, which then remains unchanged for the remainder of the total pulse width. The second bit in FIG. 1 starts again with a steep rise 100 to the high signal level 52. This level is maintained unchanged over one-third of the total pulse width, and is followed by a steep drop to the low level 53. The low level is then maintained unchanged over two-thirds of the total pulse width.

The length of the low signal level in a bit 51 determines the value of bit 51. If the signal level is predominantly low, it defines a zero value bit; otherwise it defines a bit with a value of one. The digital signal 50 of FIG. 1 thus represents the bit sequence 10010100.

Figure 2:
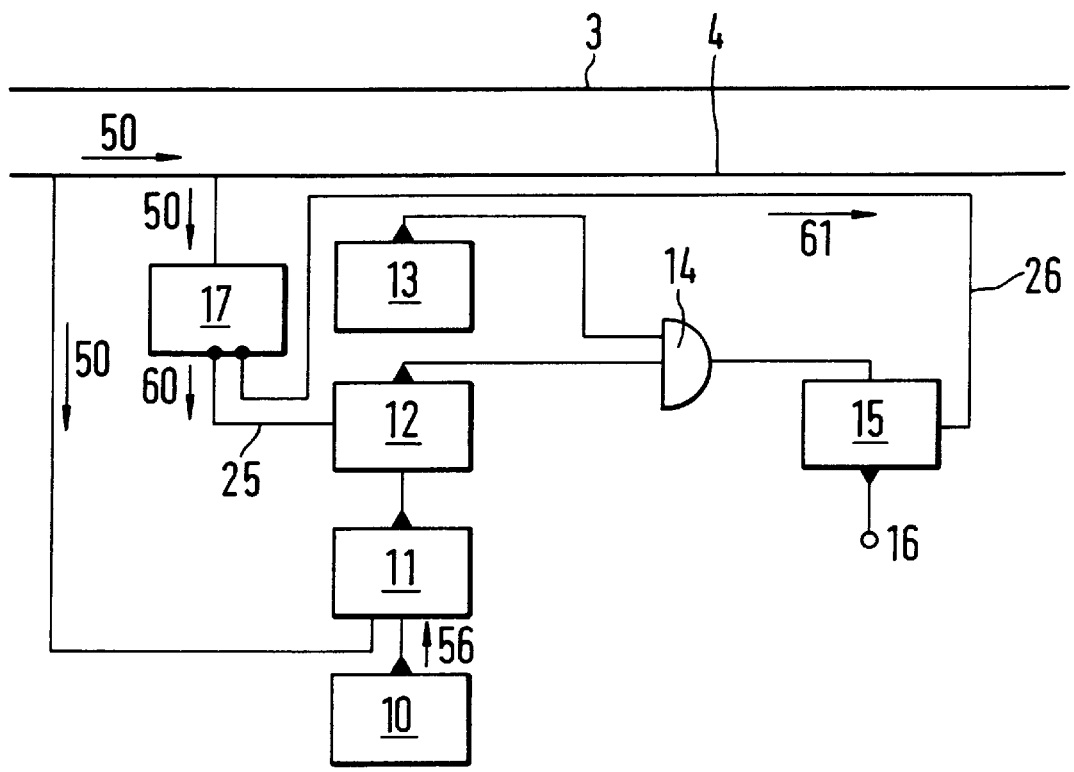
FIG. 2 shows a first circuit according to an embodiment of the present invention for decoding a digital signal with pulse-width modulated bits.

FIG. 2 shows a block diagram of a device according to the present invention used for decoding a pulse-width modulated (PWM) signal. Bus conductors 3 and 4 are conductors used for propagating signal 50. Bus 3 is the ground conductor and bus 4 is the signal conductor. Signal conductor 4 is connected to an input of an adder 11. The second input of adder 11 is connected to the output of a second signal generator 10, which thus can send a second signal 56 to adder 11. The output of adder 11, which receives the sum of the two input signals, is connected to the signal input of a triggerable integrator 12.

The trigger input of triggerable integrator 12 is connected to the output of trigger control 17 via a first triggering line 25. An input of a comparator 14 receives the output signal of integrator 12; the second input of comparator 14 is connected to a memory 13. The output of comparator 14 is connected to the input of a second memory 15. The trigger input of the second memory 15 is connected to an output of trigger control 17 via the second triggering line 26. The first trigger signal 60 flows in the first triggering line 25; the second trigger signal 61 flows in the second triggering line 26.

FIGS. 3a and 3b show a signal 58 which also contains a pulse-width modulated bit.

FIG. 3a shows a signal 58 which contains a pulse-width modulated 1. Signal 58 is obtained, for example, when a second signal 56 is added to decoded signal 50. Signal 56 is a constant signal (or a constant value) in the embodiment selected here. Signal 58 can assume two levels, a high level 52 and a low level 53. The zero level 59 is illustrated as a dashed line in FIG. 3a. It can be seen that in the embodiment selected here, the high level 52 and the low level 53 of signal 58 are equal in absolute value, but have opposite polarities. Furthermore, FIG. 3a shows integral 57 over signal 58, where the lower integration limit for integrating signal 58 is the steep rise 100 of signal 58. The integration interval is the total pulse width 54 of the pulse-width modulated bit of signal 58.

FIG. 3b illustrates signal 58 again with a pulse-width modulated bit, but the signal in FIG. 3b has a pulse-width modulated zero. The same parameters are denoted with the same numbers as in FIG. 3a.

FIG. 3c shows a first trigger signal 60 as generated by trigger control 17. The first trigger signal 60 has a triggering pulse 62, whose rise takes place shortly after the steep rise 100 of digital signal 50.

FIG. 3d shows a second trigger signal 61, also as generated by trigger control 17. Second trigger signal 60 has a trigger pulse 62, whose rise coincides in time with the steep rise 100 of digital signal 50.

The process according to the present invention is now explained with reference to FIG. 2 and FIGS. 3a through 3d. In addition to signal 50, which is to be decoded, a second signal 56 is generated by second signal generator 10. Second signal 56 is configured as a constant signal in the embodiment selected here. Signal 50 to be decoded and second signal 56 are added in adder 10. The output signal of this adder is signal 58 in FIGS. 3a and 3b, which is sent to triggerable integrator 12. Triggerable integrator 12 is designed so that its output signal is set to zero upon receipt of a trigger signal and a new integration is started by integrating the signal applied to the input. The integration result appears at the output of triggerable integrator 12. A first trigger signal 60, generated by trigger control 17, is selected as the trigger signal for the triggerable integrator. The trigger pulse of first trigger signal 60 occurs rather shortly after steep rise 100 of signal 50 to be decoded. The trigger signal is sent to triggerable integrator 12 via first triggering line 25.

FIGS. 3a and 3b show the integration results for a pulse-width modulated zero and a pulse-width modulated-one, respectively. For the present selection of second signal 56 (shown in FIG. 2), the integration results at the bit end have the same absolute values but opposite polarities for zero and one. This polarity can be measured with comparator 14 by comparison with a zero signal stored in memory 13. At the end of the bit, the output signal of comparator 14 is written into second memory 15 where it is available for further processing. For this purpose, second trigger signal 61 is provided, which has a trigger pulse at approximately the same time as steep rise 100.

The advantage of the present invention includes the fact that the signal is analyzed over the entire total pulse width 54. Thus, the signal is much less sensitive to noise and other occasional erroneous analyses. Therefore, no expensive additional circuits are needed for multiple readings of the signal near the middle of the signal to improve the signal/noise ratio.

It is, however, also conceivable and possible to allow signal 56 (shown in FIG. 2) to be an arbitrary signal. In this case different results for a pulse-width modulated one and a pulse-width modulated zero appear at the output of triggerable integrator 12, but their polarities are not necessarily different. A distinction is made between pulse-width modulated one and pulse-width modulated zero by sending the output signal of triggerable integrator 12 and the content of a memory 13, where a predefined number is stored, to a comparator. Contrary to the method described above, a finite value may have to be stored in memory 13. By selecting second signal 56 (shown in FIG. 2), as illustrated in FIGS. 3a and 3b, the change in polarity used for distinguishing between a zero and a one is also obtained when the total pulse width is changed. If the second signal is selected so that the number stored in memory 13 is a finite number, this number must be changed when the data transmission rate is changed.

Trigger signals 60 and 61 can also be synchronized in a different manner. It is, however, essential that the integral over a major part of digital signal 50 be used as a criterion for evaluating the bit.

Figure 4:
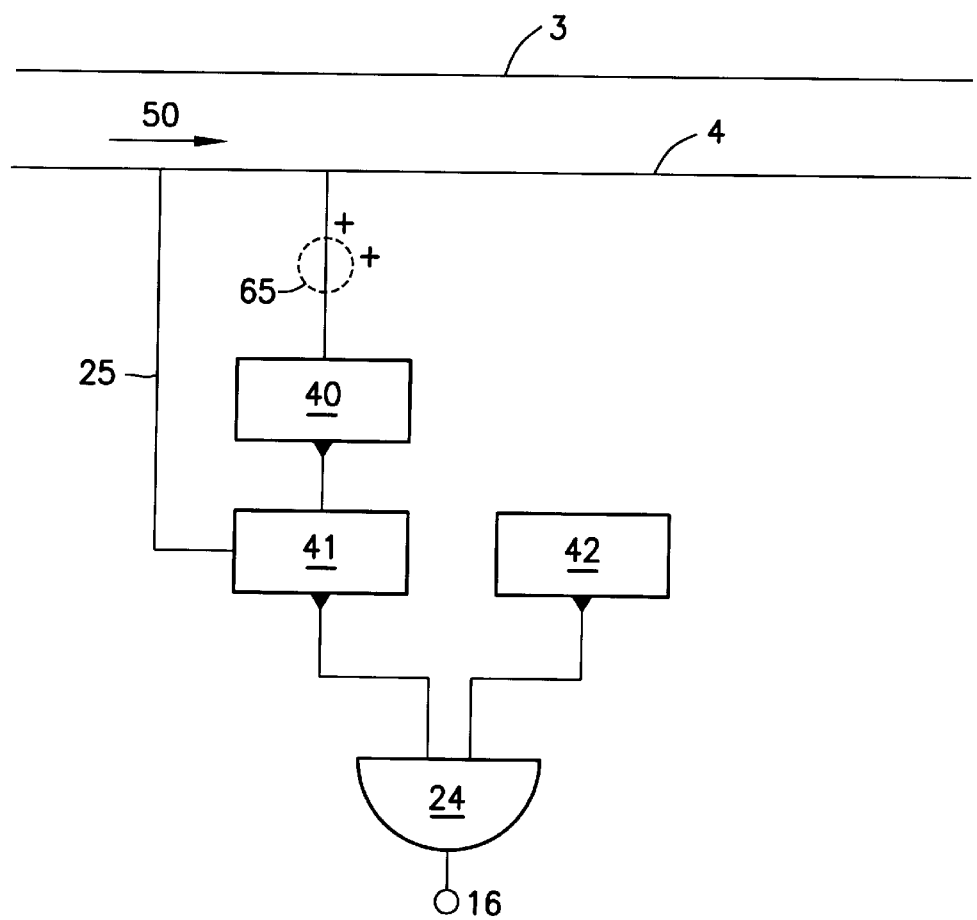
FIG. 4 shows a second circuit according to an embodiment of the present invention for decoding a digital signal with pulse-width modulated bits.

The circuit of another exemplary embodiment of the present invention is illustrated in FIG. 4. Signal 50 to be decoded is again forwarded via bus conductors 3 and 4, with bus conductor 3 being the ground conductor and bus conductor 4 the signal conductor. The signal is supplied from signal conductor 4 to a voltage-to-frequency converter (VFC) 40. The output of VFC 40 is connected to the input of a triggerable counter 41. Two inputs of a second comparator 24 are connected to the output of triggerable counter 41 and a memory 42. The output of comparator 24 represents output 16 of the decoder.

A voltage-to-frequency converter converts a signal with a certain voltage into a periodic signal with a certain frequency. As a rule, the frequency of the periodic signal is proportional to the voltage of the input signal. Non-linear voltage-to-frequency converters are, however, also conceivable, and can be used here. The output signal of voltage-to-frequency converter 40 is sent to triggerable counter 41. Triggerable counter 41 is designed so that, when it receives a trigger signal at its trigger input, the output signal is set to zero and the pulses or signal peaks received thereupon at the input are counted. The number of signal peaks appears at the output of triggerable counter 41.

Steep rise 100 of signal 50 to be decoded is advantageously used as the trigger signal for triggerable counter 41. This trigger signal is sent to triggerable counter 41 via triggering line 25. Therefore, a signal representing the number of pulses generated by the VFC after the latest steep rise 100 appears at the output of triggerable counter 41, with the frequency of the pulse generated at any instance always being proportional to the signal level of signal 50 at that instance.

The output signal of triggerable counter 41 represents a kind of integral over signal 50 to be decoded. The output signal of triggerable counter 41 is compared again with the content of a memory 42, which contains a predefined number. This is performed in second comparator 24. If the output signal of triggerable counter 41 exceeds a predefined value, the bit of signal 50 to be decoded must be a pulse-width modulated one, which the comparator then transmits to the decoder.

It is advantageous and possible to add a fourth signal 65 to signal 50 to be decoded prior to transmitting it to VFC 40. The fourth signal can be configured so that signal 50 to be decoded no longer changes its polarity after the addition of the fourth signal. The advantage of this approach includes the fact that no polarity bit has to be provided at the output of VFC 40. This simplifies the circuit.

It is also conceivable and possible to configure the fourth signal or additionally second signal 56 as a periodic signal. Here, however, it must be taken into consideration that the periodicity is the total pulse width 54. In this case, the integral is a constant number whose value can be taken into account in selecting the predefined value of memory 42 or memory 13.

Figure 5:
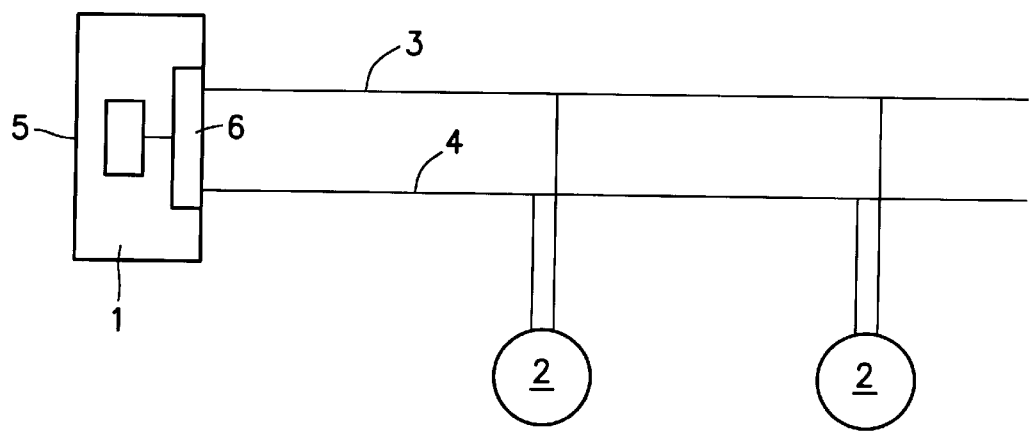
FIG. 5 shows a bus system according to an embodiment of the present invention.

One application for the process according to the present invention is shown in FIG. 5. FIG. 5 shows a controller 1, connected to a plurality of peripheral units 2 via bus conductors 3 and 4. Controller 1, which will be referred to henceforth as "device," has a process computer 5 and a bus interface 6. Bus conductors 3 and 4 are connected to bus interface 6.

Bus conductors 3 and 4 form a dual-wire bus through which messages can be transmitted between controller 1 and peripheral units 2. Since only two conductors are needed for such a bus, the wiring between controller 1 and peripheral units 2 can be very simple. The exchange of messages via the bus takes place by the transmitting station outputting electric signals, both current signals and voltage signals, to bus conductors 3 and 4, which are then analyzed by the receiving station. In the present embodiment, conductor 3 is the ground conductor and conductor 4 transmits the signal. The messages include a bit sequence where each bit is pulse-width modulated. Such a bit sequence was previously illustrated, for example, in FIG. 1.

The amplitude of the voltage signal, i.e., the difference between the low and high signal levels is selected to be low for a first application, while the total pulse width 54 is relatively large. In this kind of message transmission, it is advantageous to keep the electromagnetic interference caused by the bus as low as possible. Due to the low transmission rate, such a message transmission is particularly well suited if the messages are not very urgent.

A signal with pulse-width modulated bits, having a very large amplitude and a very small total pulse width, can also be transmitted via bus 4. The transmission of this signal causes stronger electromagnetic interference, but allows much higher transmission rates to be achieved due to the lower total pulse width 54.

Due to their different amplitudes, low-amplitude messages can be overwritten by low-amplitude messages at any time.

The system illustrated in FIG. 5 is conceived, for example, for air bag systems. Such a system has a central controller 1 and peripheral units 2, each comprising an air bag, a side air bag, a seat belt tightener or other elements. In such an air bag system, the commands for triggering the individual peripheral units 2 must be transmitted with great urgency that does not tolerate any delay. Such a system must also be capable of checking the operability of peripheral units 2 on an ongoing basis. It is therefore provided that controller 1 sends diagnostic requests to peripheral units 2, which can then confirm their operability through a return signal. Compared to the commands for triggering peripheral units 2, the diagnostic requests are less urgent. The bus system according to the present invention can therefore be especially advantageously used for an air bag system where diagnostic information about operability is exchanged on an ongoing basis between controller 1 and the respective peripheral units 2. High-urgency messages are transmitted from controller 1 to peripheral units 2 resulting in triggering the individual peripheral units 2.

What is claimed is:

1. A method for decoding a digital signal with pulse-width modulated bits, wherein a bit can assume one of a high signal level and a low signal level, and wherein a total pulse width of each bit is unknown, the method comprising the steps of:

integrating a signal level of each bit of the digital signal over the total pulse width of each bit;

transmitting the integrated signal level to a comparator;

generating a second signal; and adding a level of the second signal to the signal level of each bit of the digital signal prior to integrating the signal level of each bit;

wherein a value of the second signal provides that a polarity of the integrated signal level is determined as a function of a value of the integrated bit, and wherein the comparator is a polarity discriminator.

2. A method for decoding a digital signal with pulse-width modulated bits, wherein a bit can assume one of a high signal level and a low signal level, and wherein a total pulse width of each bit is unknown, the method comprising the steps of:

integrating a signal level of each bit of the digital signal over the total pulse width of each bit;

transmitting the integrated signal level to a comparator; and adding a constant value to the integrated signal level to the integrated signal level prior to supplying the result to the comparator;

wherein the constant value provides that a polarity of the integrated signal level is determined as a function of a value of the integrated bit, and wherein the comparator is a polarity discriminator.

3. A method for decoding a digital signal with pulse-width modulated bits, wherein a bit can assume one of a high signal level and a low signal level, and wherein a total pulse width of each bit is unknown, the method comprising:

forming an integration signal by evaluating a signal level of the digital signal over the total pulse width of each bit to a start of a following bit, the forming step including integrating the signal level of the digital signal over the total pulse width of each bit to the start of the following bit, and forming the integration signal as a function of the integrating step;

comparing the integration signal to a comparison signal;

providing the integration signal to a comparator;

generating a second signal; and adding a level of the second signal to the signal level of each bit of the digital signal prior to integrating the signal level of the digital signal over the total pulse width of each bit;

wherein a value of the second signal provides that a polarity of the integrated signal has a different polarity depending on a value of each bit, and wherein the comparator is a polarity discriminator.

4. A method for decoding a digital signal with pulse-width modulated bits, wherein a bit can assume one of a high signal level and a low signal level, and wherein a total pulse width of each bit is unknown, the method comprising:

forming an integration signal by evaluating a signal level of the digital signal over the total pulse width of each bit to a start of a following bit, the forming step including integrating the signal level of the digital signal over the total pulse width of each bit to the start of the following bit, and forming the integration signal as a function of the integrating step;

comparing the integration signal to a comparison signal;

providing the integration signal to a comparator;

adding a constant value to the integrated signal prior to supplying the integration signal to the comparator;

wherein the constant value provides that a polarity of the integrated signal has a different polarity depending on a value of each bit, and wherein the comparator is a polarity discriminator.

5. A method for decoding a digital signal with pulse-width modulated bits, wherein a bit can assume one of a high signal level and a low signal level, and wherein a total pulse width of each bit is unknown, the method comprising:

forming an integration signal by evaluating a signal level of the digital signal over the total pulse width of each bit to a start of a following bit;

comparing the integration signal to a comparison signal; and providing the integration signal to a comparator;

wherein the forming step includes forming a periodic signal having a frequency that is proportional to the signal level of the digital signal, counting a number of periods of the periodic signal, the count being started anew for each bit, and forming the integration signal as a function of the counting step.

6. The method according to claim 5, further comprising:

adding an additional signal to the digital signal, wherein a polarity of the digital signal is preserved during the total pulse width of each bit of the digital signal.

7. The method according to claim 5 further comprising:

adding a predefined number to the count result prior to transmitting the count result to the comparator.

* * * * *